US011379836B2

(12) United States Patent
Yang

(10) Patent No.: US 11,379,836 B2
(45) Date of Patent: Jul. 5, 2022

(54) METHODS AND SYSTEMS FOR RECORDING DATA BASED ON PLURALITY OF BLOCKCHAIN NETWORKS

(71) Applicant: Advanced New Technologies Co., Ltd., Grand Cayman (KY)

(72) Inventor: Xinying Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 26 days.

(21) Appl. No.: 17/162,900

(22) Filed: Jan. 29, 2021

(65) Prior Publication Data

US 2021/0158352 A1  May 27, 2021

Related U.S. Application Data

(63) Continuation of application No. PCT/CN2019/107671, filed on Sep. 25, 2019.

(30) Foreign Application Priority Data

Nov. 27, 2018  (CN) .......................... 201811427729.1

(51) Int. Cl.
*G06Q 20/40* (2012.01)
*G06Q 20/38* (2012.01)
*H04L 9/32* (2006.01)

(52) U.S. Cl.
CPC ....... *G06Q 20/401* (2013.01); *G06Q 20/3827* (2013.01); *H04L 9/3236* (2013.01);
(Continued)

(58) Field of Classification Search
None
See application file for complete search history.

(56) References Cited

U.S. PATENT DOCUMENTS

2017/0091726 A1  3/2017 Morgaan et al.
2018/0157700 A1  6/2018 Roberts et al.
(Continued)

FOREIGN PATENT DOCUMENTS

CN    106789908    5/2017
CN    107392040    11/2017
(Continued)

OTHER PUBLICATIONS

Gideon Greenspan, "Scaling blockchains with off-chain data", Jun. 13, 2018 (Year: 2018).*
(Continued)

*Primary Examiner* — Jacob C. Coppola
*Assistant Examiner* — Timothy Paul Sax
(74) *Attorney, Agent, or Firm* — Fish & Richardson P.C.

(57) ABSTRACT

Disclosed are methods and systems for recording data based on a plurality of blockchain networks. One method comprises: in response to receiving data to be recorded, generating a first-type blockchain transaction comprising the data; transmitting the first-type blockchain transaction to the first-type blockchain network; recording one or more first-type blockchain transactions into a first-type block; recording the first-type block on a blockchain of the first-type blockchain network; determining a transaction hash of each of the one or more first-type blockchain transactions in the first-type block; recording one or more second-type blockchain transactions into a second-type block; and recording the second-type block on a blockchain of the second-type blockchain network.

18 Claims, 6 Drawing Sheets

(52) U.S. Cl.
CPC ...... *G06Q 2220/00* (2013.01); *H04L 2209/38* (2013.01); *H04L 2209/56* (2013.01)

(56) References Cited

U.S. PATENT DOCUMENTS

| | | | |
|---|---|---|---|
| 2018/0165476 A1 | 6/2018 | Carey et al. | |
| 2018/0189753 A1 | 7/2018 | Konda et al. | |
| 2018/0293556 A1 | 10/2018 | Hyun et al. | |
| 2018/0322161 A1* | 11/2018 | Horii | G06F 16/219 |
| 2019/0013933 A1* | 1/2019 | Mercuri | G06F 16/27 |
| 2019/0253263 A1* | 8/2019 | Qiu | H04L 9/3265 |
| 2019/0334730 A1* | 10/2019 | Endress | G16H 40/20 |
| 2020/0034395 A1* | 1/2020 | Lu | H04L 9/0643 |
| 2020/0125661 A1* | 4/2020 | Albright | H04L 9/3239 |
| 2020/0143323 A1* | 5/2020 | Jiang | H04L 63/12 |
| 2020/0244470 A1* | 7/2020 | Ruckriemen | H04L 9/3247 |

FOREIGN PATENT DOCUMENTS

| | | |
|---|---|---|
| CN | 107453896 | 12/2017 |
| CN | 107807951 | 3/2018 |
| CN | 106530083 | 6/2018 |
| CN | 108288156 | 7/2018 |
| CN | 108346094 | 7/2018 |
| CN | 108650289 | 10/2018 |
| CN | 108805701 | 11/2018 |
| CN | 108876380 | 11/2018 |
| CN | 110020854 | 7/2019 |
| EP | 3367289 | 8/2018 |
| WO | WO 2017192220 | 11/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2019/107671, dated Jan. 2, 2020, 10 pages (with partial English translation).
Extended European Search Report in European Application No. 19889128.5, dated Oct. 5, 2021, 8 pages.

* cited by examiner

METHODS AND SYSTEMS FOR RECORDING DATA BASED ON PLURALITY OF BLOCKCHAIN NETWORKS

CROSS-REFERENCE TO RELATED APPLICATIONS

This application is a continuation of PCT Application No. PCT/CN2019/107671, filed on Sep. 25, 2019, which claims priority to Chinese Patent Application No. 201811427729.1, filed on Nov. 27, 2018, and each application is hereby incorporated by reference in its entirety.

TECHNICAL FIELD

Embodiments of the present specification relate to the field of information technologies, and in particular, to methods and systems for recording data based on a plurality of blockchain networks.

BACKGROUND

With the development of blockchain technologies, a mode of recording data based on a blockchain network is gradually emerging.

For example, in the copyright protection field, a blockchain network for recording a copyright work and copyright-related information of the copyright work (such as copyright owner information, copyright authorization information, and copyright assignment information, etc.) can be established. A user can submit a target work created by the user to any node in the blockchain network, and the node constructs a blockchain transaction based on user information of the user and the target work and broadcasts the blockchain transaction to other nodes. Each node in the blockchain network will write the blockchain transaction into the blockchain based on a consensus algorithm, which is equivalent to performing distributed recording of the fact that "the target work is created by the user".

In practice, there are a large quantity of blockchain networks that provide data recording services on the market, and the blockchain networks are independent of each other. However, a user may upload data to more than one blockchain network, which means that if the user wants to verify whether the data uploaded by the user is written into the blockchain, the user has to separately send a verification request to the more than one blockchain network.

Therefore, the user needs a more convenient data recording method.

SUMMARY

To alleviate a problem that an existing data recording method is not convenient for a user, embodiments of the present specification provide methods and systems for recording data based on a plurality of blockchain networks. Technical solutions are as follows:

According to a first aspect of some embodiments of the present specification, a method for recording data based on a plurality of blockchain networks is provided, where a data recording system includes at least two first-type blockchain networks and one second-type blockchain network, and the method includes the following: when obtaining data to be stored, any node in each first-type blockchain network constructs a first-type blockchain transaction including the obtained data to be stored, and broadcasts the constructed first-type blockchain transaction to the first-type blockchain network; when needing to write data to a blockchain, each node in the first-type blockchain network packages, based on a consensus algorithm, several first-type blockchain transactions into a first-type recording block and writes the first-type recording block into a blockchain of the node itself any node in the first-type blockchain network calculates a transaction hash of each first-type blockchain transaction in the first-type recording block, and sends the transaction hash of each first-type blockchain transaction to a target node in the second-type blockchain network; the target node constructs, for each received transaction hash, a second-type blockchain transaction including the transaction hash; the target node broadcasts the second-type blockchain transaction corresponding to each transaction hash to the second-type blockchain network; and when needing to write data to a blockchain, each node in the second-type blockchain network packages, based on the consensus algorithm, several second-type blockchain transactions into a second-type recording block and writes the second-type recording block into a blockchain of the node itself.

According to a second aspect of some embodiments of the present specification, a blockchain system is provided, including at least two first-type blockchain networks and one second-type blockchain network; where when obtaining data to be stored, any node in each first-type blockchain network constructs a first-type blockchain transaction including the obtained data to be stored, and broadcasts the constructed first-type blockchain transaction to the first-type blockchain network; when needing to write data to a blockchain, each node in the first-type blockchain network packages, based on a consensus algorithm, several first-type blockchain transactions into a first-type recording block and writes the first-type recording block into a blockchain of the node itself any node in the first-type blockchain network calculates a transaction hash of each first-type blockchain transaction in the first-type recording block, and sends the transaction hash of each first-type blockchain transaction to a target node in the second-type blockchain network; and the target node in the second-type blockchain network constructs, for each received transaction hash, a second-type blockchain transaction including the transaction hash; broadcasts the second-type blockchain transaction corresponding to each transaction hash to the second-type blockchain network; and when needing to write data to a blockchain, each node in the second-type blockchain network packages, based on the consensus algorithm, several second-type blockchain transactions into a second-type recording block and writes the second-type recording block into a blockchain of the node itself.

According to a third aspect of some embodiments of the present specification, a blockchain subsystem is provided, including a plurality of nodes; a data recording system includes at least two first-type blockchain networks and the blockchain subsystem; for each received transaction hash, a target node in the blockchain subsystem constructs a second-type blockchain transaction including the transaction hash; and broadcasts the second-type blockchain transaction corresponding to each transaction hash to the blockchain subsystem; and when needing to write data to a blockchain, each node in the blockchain subsystem packages, based on the consensus algorithm, several second-type blockchain transactions into a second-type recording block and writes the second-type recording block into a blockchain of the node itself where each transaction hash received by the target node in the blockchain subsystem is a transaction hash that is sent by any node in any first-type blockchain network and that is of each first-type blockchain transaction in the first-type recording block, each first-type blockchain transaction in the first-type recording block includes data to be stored, and the first-type recording block has been written by the first-type blockchain network into a blockchain thereof.

In the technical solutions provided in some embodiments of the present specification, data stored in blockchains of at least two first-type blockchain networks is mapped to a blockchain of a second-type blockchain network. Specifically, any first-type blockchain network sends a transaction hash of each constructed first-type blockchain transaction to the second-type blockchain network, and the second-type blockchain network constructs a second-type blockchain transaction based on the received transaction hash and writes the second-type blockchain transaction into the blockchain of the second-type blockchain network. As such, it's equivalent to that transaction hashes of first-type blockchain transactions recorded in the blockchain of each first-type blockchain network are further encapsulated into second-type blockchain transactions, which are gathered on the blockchain of the second-type blockchain network. If a user wants to verify whether a first-type blockchain transaction has been written into a blockchain, the user can query the second-type blockchain network based on a transaction hash of the first-type blockchain transaction. If a second-type blockchain transaction including the transaction hash of the first-type blockchain transaction exists in the blockchain of the second-type blockchain network, it indicates that the first-type blockchain transaction has been written into the blockchain.

According to some embodiments of the present specification, if a user uploads data to more than one blockchain network, and the user subsequently wants to verify whether the data uploaded by the user is written into a blockchain, the user does not need to separately send a verification request to the more than one blockchain network, but only needs to send a verification request to the second-type blockchain network, which is more convenient for the user.

It should be understood that the previous general description and the following detailed description are merely examples and illustrative, and cannot limit some embodiments of the present specification.

In addition, any one of some embodiments in the present specification does not need to achieve all the previous effects.

BRIEF DESCRIPTION OF DRAWINGS

To describe the technical solutions in some embodiments of the present specification or in the existing technology more clearly, the following briefly describes the accompanying drawings needed for describing some embodiments or the existing technology. Clearly, the accompanying drawings in the following description merely show some embodiments of the present specification, and a person of ordinary skill in the art can still derive other drawings from these accompanying drawings.

DESCRIPTION OF EMBODIMENTS

It is worthwhile to note that the transaction described in the present specification refers to a piece of data that is created by a user by using a blockchain client device and that needs to be finally published to a distributed database of the blockchain. A transaction is a data structure agreed upon in a blockchain protocol. If a piece of data is to be stored in a blockchain, it needs to be encapsulated into a transaction.

Transactions in the blockchain include transactions in a narrow sense and transactions in a broad sense. A transaction in a narrow sense refers to a value transfer published by a user to the blockchain. For example, in a conventional Bitcoin blockchain network, a transaction can be a transfer initiated by a user in the blockchain. A transaction in a broad sense refers to service data that is published by a user to the blockchain and that has a service intention. For example, an operator can establish a consortium blockchain based on actual service needs, and deploy some other types of online services (for example, a house leasing service, a vehicle scheduling service, an insurance claim service, a credit service, and a medical service) that are not related to value transfer in the consortium blockchain. In such consortium blockchain, a transaction can be a service message or a service request that is published by a user in the consortium blockchain and that has a service intention.

To make a person skilled in the art better understand the technical solutions in some embodiments of the present specification, the following describes in detail the technical solutions in some embodiments of the present specification with reference to the accompanying drawings in some embodiments of the present specification. Clearly, the described embodiments are merely some but not all of some embodiments of the present specification. All other embodiments obtained by a person of ordinary skill in the art based on some embodiments of the present specification shall fall within the protection scope of the present specification.

The technical solutions provided in some embodiments of the present specification are described in detail below with reference to the accompanying drawings.

Figure 1:
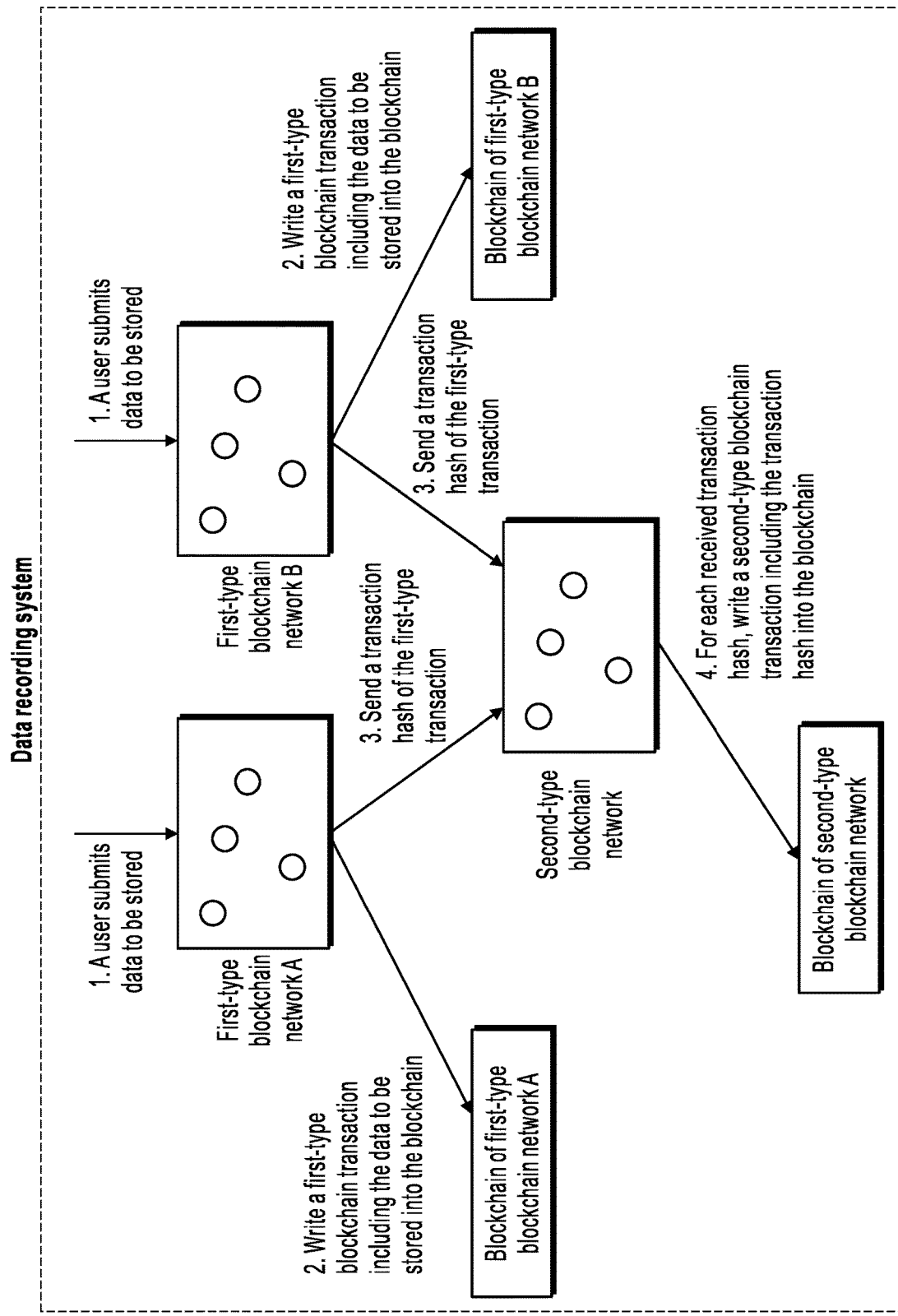
FIG. 1 is a schematic structural diagram illustrating a first blockchain system based on a plurality of blockchain networks, according to some embodiments of the present specification.

FIG. 1 is a schematic structural diagram illustrating a blockchain system (or referred to as a data recording system), according to some embodiments of the present specification. As shown in FIG. 1, the data recording system includes at least two first-type blockchain networks (two first-type blockchain networks are shown in FIG. 1) and one second-type blockchain network. The first-type blockchain network can be specifically a consortium blockchain network. The second-type blockchain network can be specifically a consortium blockchain network or a private blockchain network.

When obtaining data to be stored, any node in each first-type blockchain network constructs a first-type blockchain transaction including the obtained data to be stored, and broadcasts the constructed first-type blockchain transaction to the first-type blockchain network; when needing to write data to a blockchain, each node in the first-type blockchain network packages, based on a consensus algorithm, several first-type blockchain transactions into a first-type recording block and writes the first-type recording block into a blockchain of the node itself any node in the first-type blockchain network calculates a transaction hash of each first-type blockchain transaction in the first-type recording block, and sends the transaction hash of each first-type blockchain transaction to a target node in the second-type blockchain network; and the target node in the second-type blockchain network constructs, for each received transaction hash, a second-type blockchain transaction including the transaction hash; broadcasts the second-type blockchain transaction corresponding to each transaction hash to the second-type blockchain network; and when needing to write data to a blockchain, each node in the second-type blockchain network packages, based on the consensus algorithm, several second-type blockchain transactions into a second-type recording block and writes the second-type recording block into a blockchain of the node itself.

It is worthwhile to note that, in some embodiments of the present specification, the first-type blockchain network is a blockchain network responsible for recording data to be stored submitted by a user, and the first-type blockchain transaction is a data structure including the data to be stored. The second-type blockchain network is a blockchain network responsible for recording a transaction hash of a first-type blockchain transaction submitted by the first-type blockchain network, and the second-type blockchain transaction is a data structure including the transaction hash of the first-type blockchain transaction.

In some embodiments of the present specification, a user can submit data to be stored to any first-type blockchain network. Assume that the user submits the data to be stored to first-type blockchain network A, actually the user submits the data to be stored to any node in first-type blockchain network A. The node in first-type blockchain network A that obtains the data to be stored can construct a first-type blockchain transaction including the data to be stored, and then broadcast the first-type blockchain transaction to other nodes in first-type blockchain network A. Each node in first-type blockchain network A usually stores the obtained first-type blockchain transaction into a cache of the node. Over time, first-type blockchain network A can accommodate more and more data to be stored, which means that a cache of each node in first-type blockchain network A accumulates more and more first-type blockchain transactions.

Whenever a consensus triggering condition corresponding to first-type blockchain network A is satisfied, each node in first-type blockchain network A can salvage, based on the consensus algorithm, several first-type blockchain transactions from a cache of the node, and then package the salvaged first-type blockchain transactions into a first-type recording block and store the first-type recording block into a blockchain of the node. The consensus triggering condition corresponding to first-type blockchain network A can be specifically as designated period of time expires, or the quantity of first-type blockchain transactions accumulated in a cache of each node reaches a designated quantity.

In addition, each time the first-type blockchain network generates one first-type recording block, the following operations are triggered: any node in first-type blockchain network A calculates a transaction hash of each first-type blockchain transaction in the currently generated first-type recording block, and sends the transaction hash of each first-type blockchain transaction in the currently generated first-type recording block to the target node in the second-type blockchain network. The target node can be any node in the second-type blockchain network, or can be a certain node in the second-type blockchain network that is designated in advance.

Therefore, the target node can further consider each received transaction hash as data to be written into the blockchain, and construct a second-type blockchain transaction including the transaction hash. The target node also broadcasts each constructed second-type blockchain transaction to other nodes in the second-type blockchain network.

Whenever a consensus triggering condition corresponding to the second-type blockchain network is satisfied, each node in second-type blockchain network can salvage, based on the consensus algorithm, several second-type blockchain transactions from a cache of the node, and then package the salvaged second-type blockchain transactions into a second-type recording block and store the second-type recording block into a blockchain of the node.

The following describes in more detail the data recording system and a data recording method based on the data recording system shown in FIG. 1.

Figure 2:
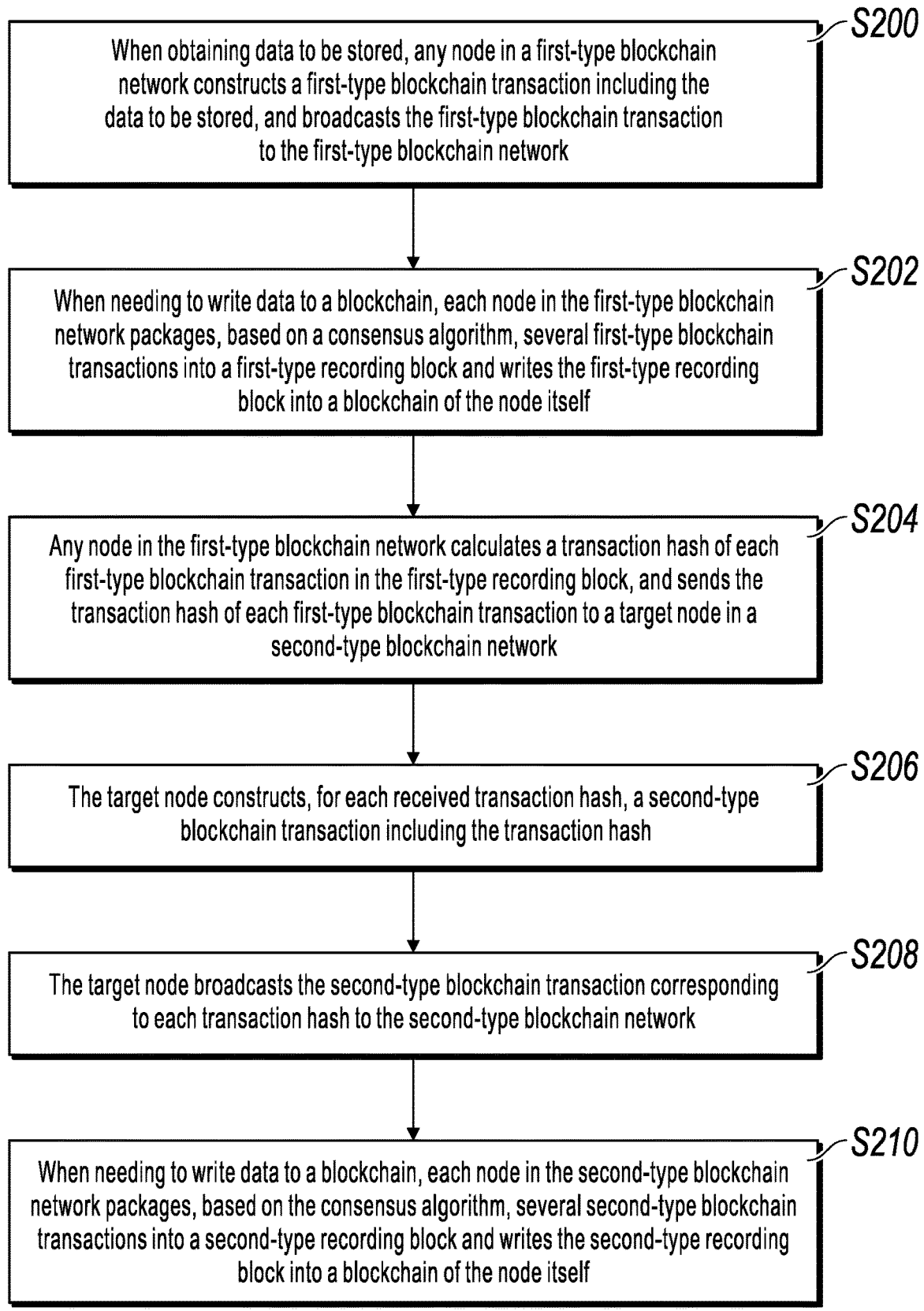
FIG. 2 is a schematic flowchart illustrating a method for recording data based on a plurality of blockchain networks, according to some embodiments of the present specification.

FIG. 2 is a schematic flowchart illustrating a method for recording data based on a plurality of blockchain networks, according to some embodiments of the present specification. The method includes the following steps:

S200: when obtaining data to be stored, any node in each first-type blockchain network constructs a first-type blockchain transaction including the obtained data to be stored, and broadcasts the constructed first-type blockchain transaction to the first-type blockchain network.

S202: when needing to write data to a blockchain, each node in the first-type blockchain network packages, based on a consensus algorithm, several first-type blockchain transactions into a first-type recording block and writes the first-type recording block into a blockchain of the node itself.

S200 to S202 describe a recording process in which any first-type blockchain network records data to be stored submitted by a user. After S200 to S202, the data to be stored is encapsulated into a first-type blockchain transaction, and is written into the blockchain of the first-type blockchain network.

S204: any node in the first-type blockchain network calculates a transaction hash of each first-type blockchain transaction in the first-type recording block, and sends the transaction hash of each first-type blockchain transaction to a target node in the second-type blockchain network.

It is worthwhile to note that S204 can be performed before the first-type recording block is written into the blockchain, or S204 can be performed after the first-type recording block is written into the blockchain. It should be further noted that S204 is usually completed before each node in the first-type blockchain network packages a next block.

When each first-type blockchain network is a consortium blockchain network, for sake of data security, the first-type consortium blockchain network cannot disclose a plaintext of the first-type blockchain transaction stored in the first-type consortium blockchain network to nodes in the second-type blockchain network. Therefore, any node in the first-type blockchain network needs to process each first-type blockchain transaction in the currently generated first-type recording block into a transaction hash, and then send the transaction hash to the second-type blockchain network. Each transaction hash received by the second-type blockchain network is equivalent to a ciphertext of each first-type blockchain transaction in the first-type recording block.

In practice, after a user submits data to be stored to a certain first-type blockchain network, the first-type blockchain network returns, to the user, a transaction hash of a first-type blockchain transaction including the data to be stored. The user can verify, based on the held transaction hash, whether the data to be stored uploaded by the user is written into a blockchain of the first-type blockchain network.

In some embodiments of the present specification, after calculating the transaction hash of each first-type blockchain transaction in the first-type recording block, any node in the first-type blockchain network can specifically successively send the transaction hash of each first-type blockchain transaction to the target node in the second-type blockchain network based on a sequence of first-type blockchain transactions in the first-type recording block. As such, it can be ensured that the target node can successively receive the transaction hash of each first-type blockchain transaction based on a sequence of the first-type blockchain transactions in the first-type recording block.

S206: the target node constructs, for each received transaction hash, a second-type blockchain transaction including the transaction hash.

S208: the target node broadcasts the second-type blockchain transaction corresponding to each transaction hash to the second-type blockchain network.

S210: when needing to write data to a blockchain, each node in the second-type blockchain network packages, based on the consensus algorithm, several second-type blockchain transactions into a second-type recording block and writes the second-type recording block into a blockchain of the node itself.

In S208, the target node can successively broadcast the second-type blockchain transaction corresponding to each transaction hash to the second-type blockchain network based on a sequence of receiving the transaction hashes. As such, after each transaction hash is written into the blockchain of the second-type blockchain network, a sequence of the transaction hashes in the blockchain of the second-type blockchain network is the same as a sequence of the first-type blockchain transactions in the first-type recording block.

In conclusion, in some embodiments of the present specification, data stored in blockchains of the at least two first-type blockchain networks is mapped to the blockchain of the second-type blockchain network. Specifically, any first-type blockchain network sends a transaction hash of each constructed first-type blockchain transaction to the second-type blockchain network, and the second-type blockchain network constructs a second-type blockchain transaction based on the received transaction hash and writes the second-type blockchain transaction into the blockchain of the second-type blockchain network.

As such, it's equivalent to that transaction hashes of first-type blockchain transactions stored in the blockchain of each first-type blockchain network are further encapsulated into second-type blockchain transactions, which are gathered on the blockchain of the second-type blockchain network. If a user wants to verify whether a first-type blockchain transaction has been written into a blockchain, the user can query the second-type blockchain network based on a transaction hash of the first-type blockchain transaction. If a second-type blockchain transaction including the transaction hash of the first-type blockchain transaction exists in the blockchain of the second-type blockchain network, it indicates that the first-type blockchain transaction has been written into the blockchain.

According to some embodiments of the present specification, if a user uploads data to more than one blockchain network, and the user subsequently wants to verify whether the data uploaded by the user is written into a blockchain, the user does not need to separately send a verification request to the more than one blockchain network, but only needs to send a verification request to the second-type blockchain network, which is more convenient for the user.

Figure 3:
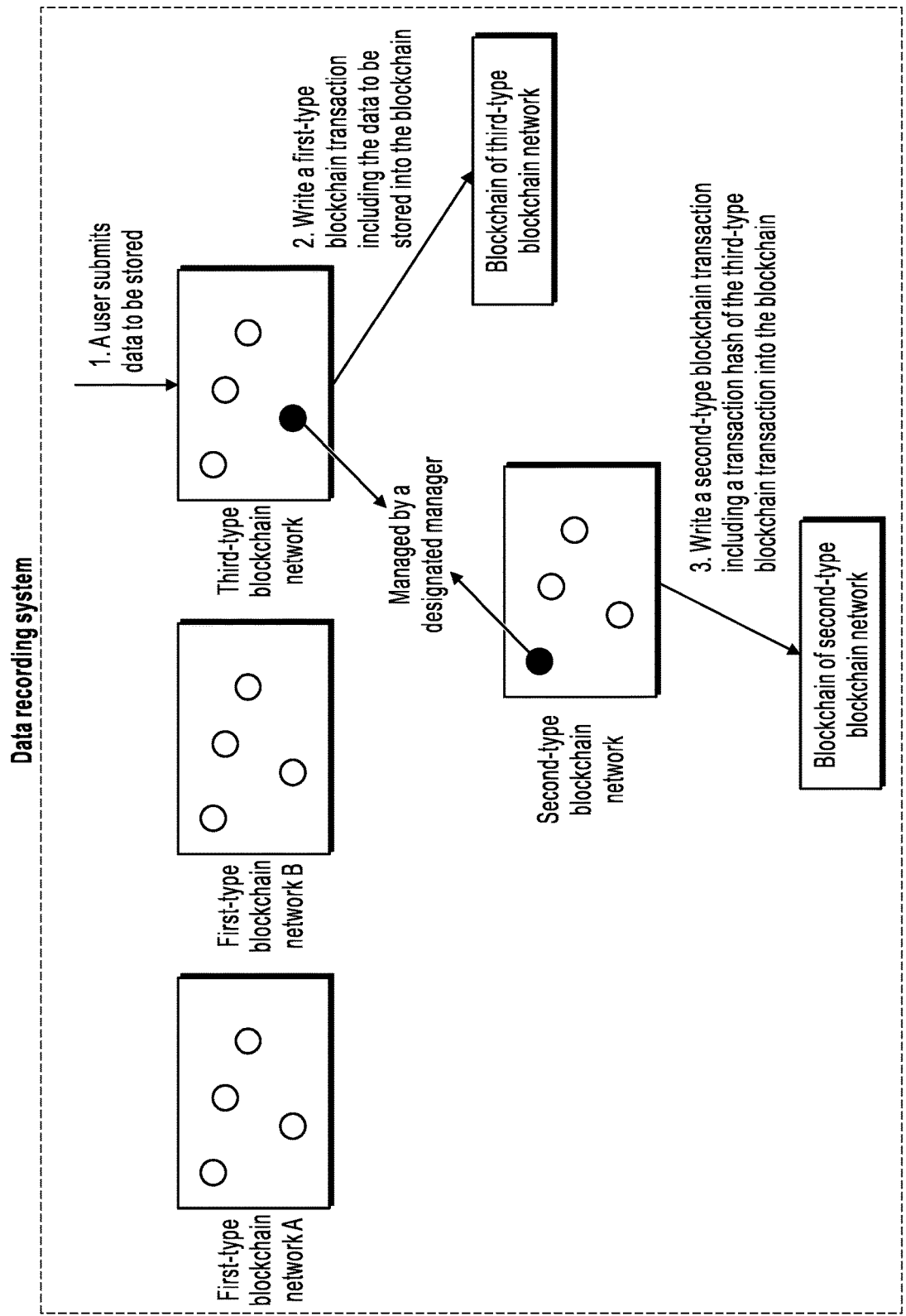
FIG. 3 is a schematic structural diagram illustrating a second blockchain system based on a plurality of blockchain networks, according to some embodiments of the present specification.

In addition, in some embodiments of the present specification, the data recording system can further include at least one third-type blockchain network, as shown in FIG. 3. At least one node in each third-type blockchain network is managed by a designated manager, and at least one node in the second-type blockchain network is managed by the designated manager. In FIG. 3, both a solid node in the second-type blockchain network and a solid node in the third-type blockchain network are nodes managed by the designated manager.

It is worthwhile to note that if there are a plurality of nodes managed by the same designated manager, it means that even if the plurality of nodes are nodes in different blockchain networks, the plurality of nodes can share data stored on each other. That is, in FIG. 3, because the node managed by the designated manager in the third-type blockchain network stores a blockchain of the third-type blockchain network, the node managed by the designated manager in the second-type blockchain network can also freely access the blockchain of the third-type blockchain network to obtain a plaintext of any third-type blockchain transaction.

It should be further noted that if the second-type blockchain network is a private blockchain network, it means that each node in the second-type blockchain network is managed by the designated manager, that is, in FIG. 3, each node in the second-type blockchain network is a solid node.

Based on this, in some embodiments of the present specification, when obtaining data to be stored, any node in each third-type blockchain network can construct a third-type blockchain transaction including the obtained data to be stored, and broadcast the constructed third-type blockchain transaction to the third-type blockchain network. When needing to write data to a blockchain, each node in the third-type blockchain network packages, based on the consensus algorithm, several third-type blockchain transactions into a third-type recording block and writes the third-type recording block into a blockchain of the node itself.

Then, any node managed by the designated manager in the second-type blockchain network can obtain the third-type recording block, and calculate a transaction hash of each third-type blockchain transaction in the third-type recording block; and construct, for each third-type blockchain transaction, a second-type blockchain transaction including a transaction hash of the third-type blockchain transaction, and broadcast each second-type blockchain transaction to the second-type blockchain network, so the second-type blockchain transaction including the transaction hash of the third-type blockchain transaction is written into the blockchain of the second-type blockchain network.

Further, any node managed by the designated manager in the second-type blockchain network can successively broadcast the second-type blockchain transaction corresponding to each third-type blockchain transaction to the second-type blockchain network based on a sequence of the third-type blockchain transactions in the third-type recording block. As such, a sequence of writing the second-type blockchain transaction corresponding to each third-type blockchain transaction into the blockchain is consistent with a sequence of the third-type blockchain transactions in the third-type recording block.

A second-type blockchain transaction corresponding to a certain third-type blockchain transaction refers to a second-type blockchain transaction including a transaction hash of the third-type blockchain transaction.

Figure 4:
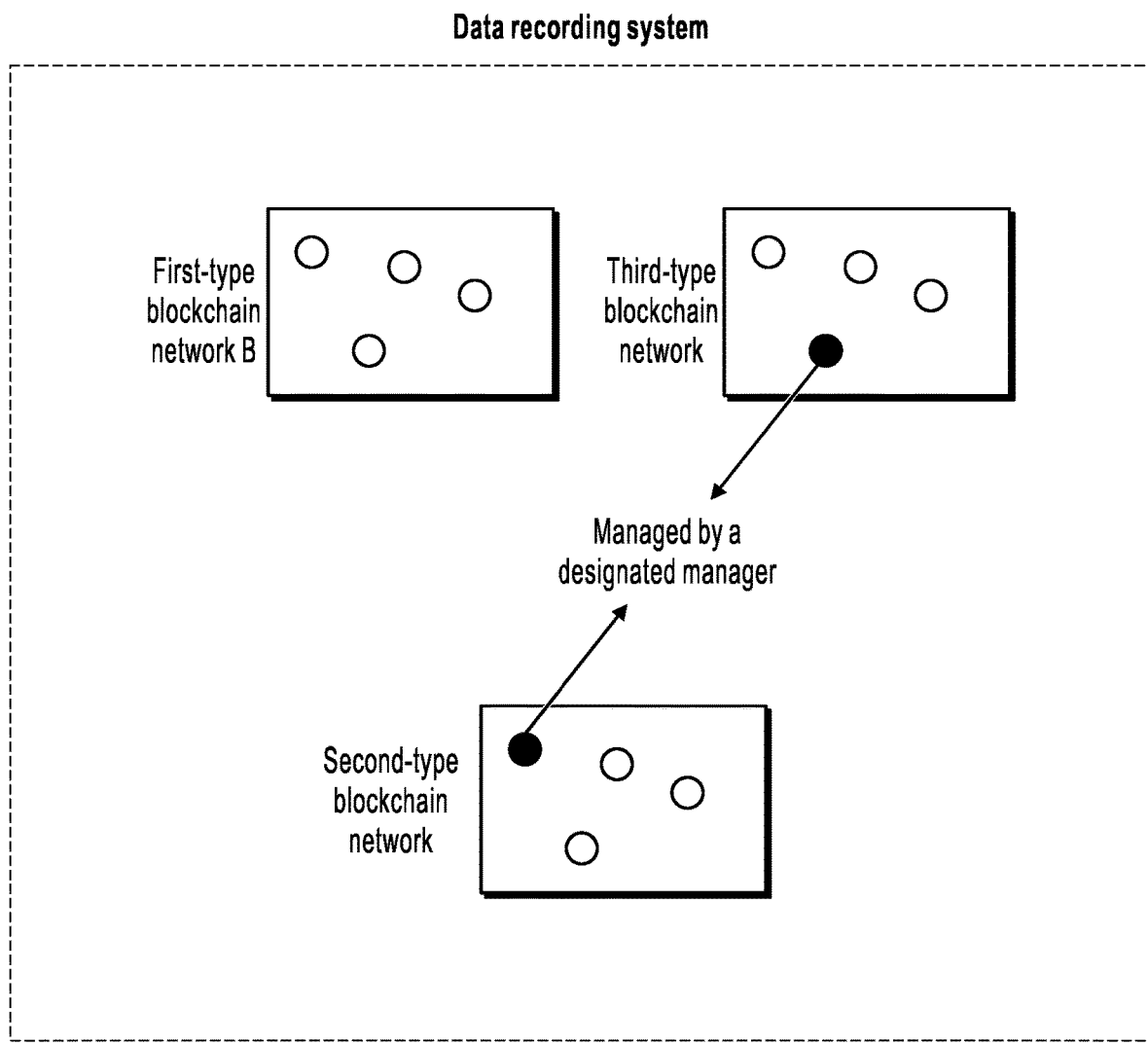
FIG. 4 is a schematic structural diagram illustrating a third blockchain system based on a plurality of blockchain networks, according to some embodiments of the present specification.

In addition, the data recording system shown in FIG. 3 can be modified to obtain the data recording system shown in FIG. 4. In FIG. 4, the data recording system includes at least one first-type blockchain network, one second-type blockchain network, and at least one third-type blockchain network. In FIG. 4, data recording can still be performed based on the previous principle, and details are omitted for simplicity.

In some embodiments of the present specification, when obtaining data to be stored, any node in the second-type blockchain network constructs a second-type blockchain transaction including the obtained data to be stored, and broadcasts the constructed second-type blockchain transaction to the second-type blockchain network. That is, the second-type blockchain network can store data to be stored submitted by a user in addition to a transaction hash of each first-type blockchain transaction and a transaction hash of a third-type blockchain transaction.

In addition, in the existing technology, after a user submits different data to be stored to more than one blockchain network, and the different data to be stored is written into the blockchain, if the user wants to read the previously-submitted data to be stored from the blockchain, the user has to separately read data from different blockchains maintained by the more than one blockchain network.

However, in some embodiments of the present specification, when data to be stored is submitted to any first-type blockchain network, the first-type blockchain network writes a first-type blockchain transaction including the data to be stored into a blockchain of the first-type blockchain network, and sends a transaction hash of the first-type blockchain transaction including the data to be stored to the second-type blockchain network, so the second-type blockchain network writes a second-type blockchain transaction including the transaction hash and a network identifier of the first-type blockchain network into a blockchain of the second-type blockchain network.

That is, in S206 in FIG. 2, the target node constructs, for each received transaction hash, a second-type blockchain transaction including the transaction hash and the network identifier of the first-type blockchain network.

When data to be stored is submitted to any third-type blockchain network, the third-type blockchain network writes a third-type blockchain transaction including the data to be stored into a blockchain of the third-type blockchain network, and any node managed by the designated manager in the second-type blockchain network broadcasts a second-type blockchain transaction including a transaction hash of the third-type blockchain transaction and a network identifier of the third-type blockchain network, to the second-type blockchain network, so as to write the second-type blockchain transaction into the blockchain of the second-type blockchain network.

That is, in the architecture shown in FIG. 3, any node managed by the designated manager in the second-type blockchain network obtains the third-type recording block, calculates a transaction hash of each third-type blockchain transaction in the third-type recording block, and constructs, for each third-type blockchain transaction, a second-type blockchain transaction including a transaction hash of the third-type blockchain transaction and the network identifier of the third-type blockchain network.

As such, with a transaction hash of a first-type blockchain transaction, a user can read the first-type blockchain transaction by using the second-type blockchain network. Also, with a transaction hash of a third-type blockchain transaction, the user can read the third-type blockchain transaction by using the second-type blockchain network.

Figure 5:
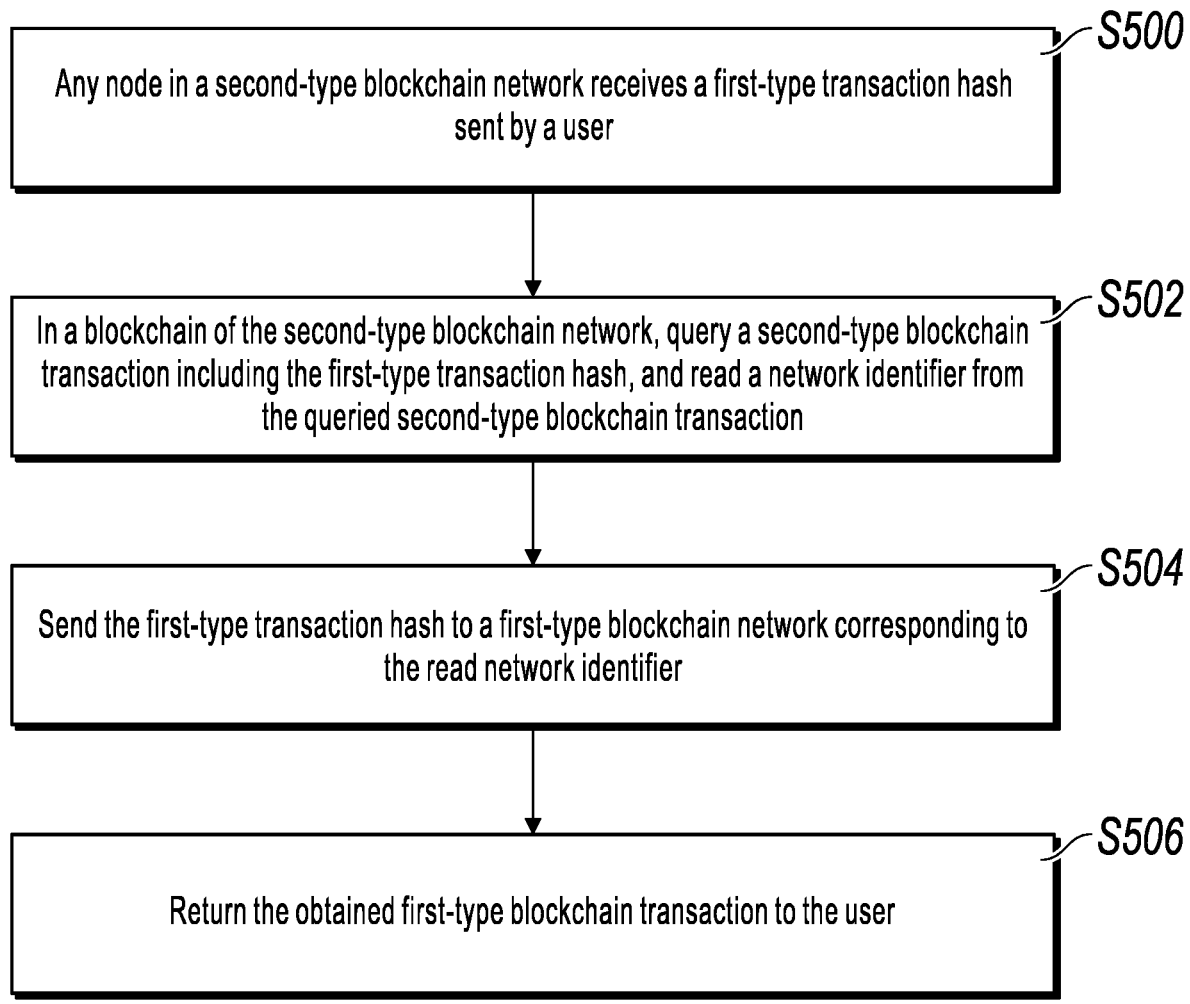
FIG. 5 is a schematic flowchart illustrating a method for reading data based on a plurality of blockchain networks, according to some embodiments of the present specification.

FIG. 5 is a schematic flowchart illustrating a method for reading data based on a plurality of blockchain networks, according to some embodiments of the present specification. The method includes the following steps:

S500: any node in a second-type blockchain network receives a first-type transaction hash sent by a user.

In some embodiments of the present specification, the first-type transaction hash is a transaction hash of a first-type blockchain transaction to be read.

S502: in a blockchain of the second-type blockchain network, query a second-type blockchain transaction including the first-type transaction hash, and read a network identifier from the queried second-type blockchain transaction.

S504: send the first-type transaction hash to a first-type blockchain network corresponding to the read network identifier.

As such, any node in the first-type blockchain network corresponding to the read network identifier can return a first-type blockchain transaction corresponding to the first-type transaction hash, to the second-type blockchain network.

S506: return the obtained first-type blockchain transaction to the user.

In addition, in the method shown in FIG. 5, any node managed by the designated manager in the second-type blockchain network can receive a third-type transaction hash sent by the user, where the third-type transaction hash is a transaction hash of a third-type blockchain transaction to be read. Subsequently, a second-type blockchain transaction including the third-type transaction hash can be queried in the blockchain of the second-type blockchain network, and a network identifier can be read from the queried second-type blockchain transaction; and a third-type blockchain transaction corresponding to the third-type transaction hash is read from a blockchain of a third-type blockchain network corresponding to the read network identifier, and returned to the user.

It is worthwhile to note that, because a node managed by the designated manager in the second-type blockchain network can share data with a node managed by the designated manager in the third-type blockchain network corresponding to the read network identifier, the node managed by the designated manager in the second-type blockchain network can actually directly obtain, without sending a request, the third-type blockchain transaction corresponding to the third-type transaction hash.

The present disclosure further provides a blockchain subsystem, including a plurality of nodes;

a data recording system includes at least two first-type blockchain networks and the blockchain subsystem;

for each received transaction hash, a target node in the blockchain subsystem constructs a second-type blockchain transaction including the transaction hash; and broadcasts the second-type blockchain transaction corresponding to each transaction hash to the blockchain subsystem; and when needing to write data to a blockchain, each node in the blockchain subsystem packages, based on the consensus algorithm, several second-type blockchain transactions into a second-type recording block and writes the second-type recording block into a blockchain of the node itself; where each transaction hash received by the target node in the blockchain subsystem is a transaction hash that is sent by any node in any first-type blockchain network and that is of each first-type blockchain transaction in the first-type recording block, each first-type blockchain transaction in the first-type recording block includes data to be stored, and the first-type recording block has been written by the first-type blockchain network into a blockchain thereof.

In addition, the present disclosure further provides another blockchain subsystem, including a plurality of nodes;

a data recording system includes at least two first-type blockchain networks and the blockchain subsystem;

when data to be stored is submitted to any first-type blockchain network, the first-type blockchain network writes a first-type blockchain transaction including the data to be stored into a blockchain of the first-type blockchain network, and sends a transaction hash of the first-type blockchain transaction including the data to be stored to the blockchain subsystem, so the blockchain subsystem writes a second-type blockchain transaction including the transaction hash and a network identifier of the first-type blockchain network into a blockchain of the blockchain subsystem; and any node in the blockchain subsystem receives a first-type transaction hash sent by a user, where the first-type transaction hash is a transaction hash of a first-type blockchain transaction to be read; queries, in the blockchain of the second-type blockchain network, a second-type blockchain transaction including the first-type transaction hash, and reads a network identifier from the queried second-type blockchain transaction; sends the first-type transaction hash to a first-type blockchain network corresponding to the read network identifier, so as to obtain a first-type blockchain transaction corresponding to the first-type transaction hash and returned by the first-type blockchain network; and returns the obtained first-type blockchain transaction to the user.

Some embodiments of the present specification further provide a computer device. The computer device includes at least a memory, a processor, and a computer program that is stored in the memory and that can run on the processor. When executing the program, the processor implements the functions of the method in FIG. 2.

Figure 6:
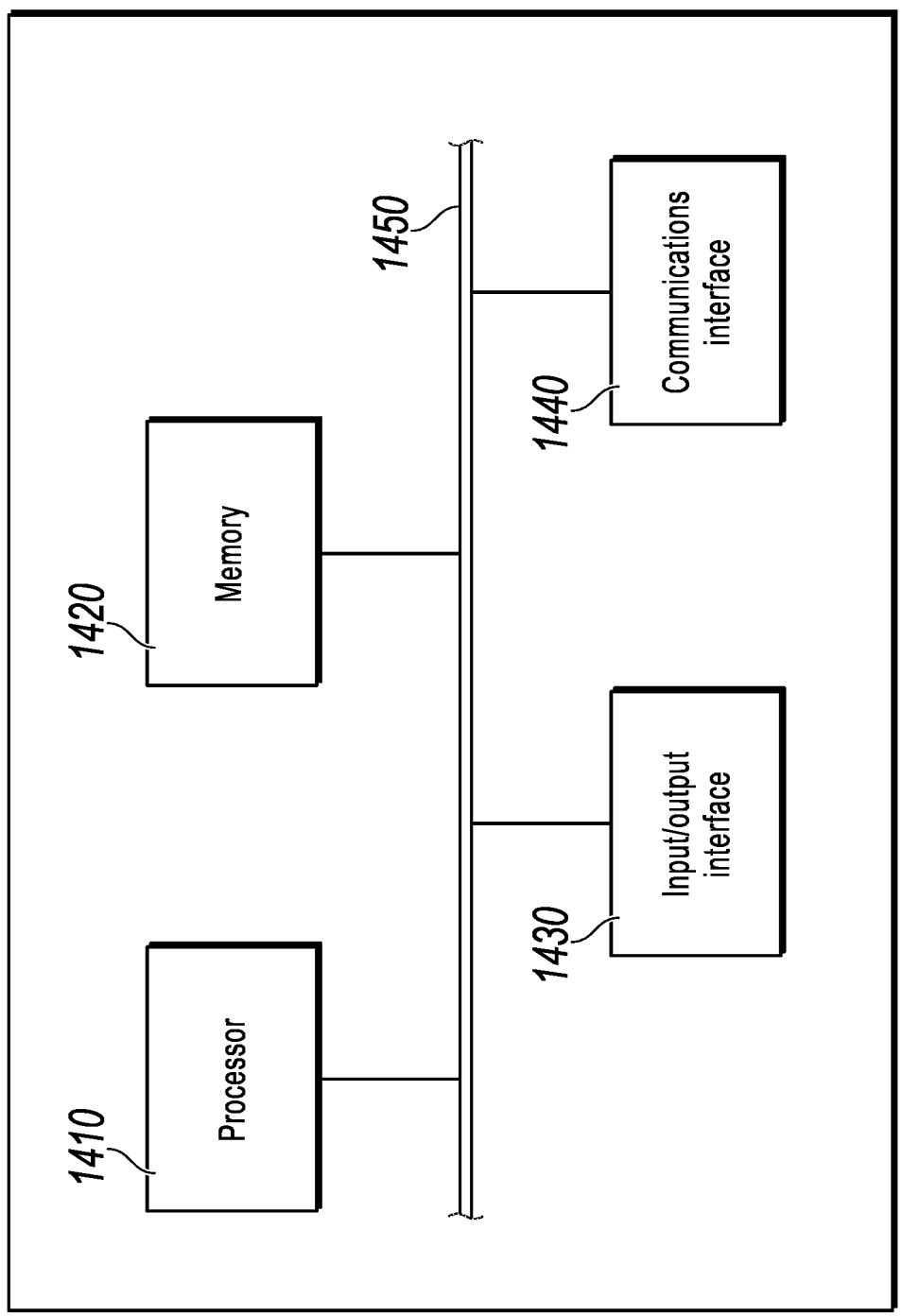
FIG. 6 is a schematic structural diagram illustrating a computer device used to configure an apparatus in some embodiments of the present specification.

FIG. 6 is a more detailed schematic diagram illustrating a hardware structure of a computing device, according to some embodiments of the present specification. The device can include a processor 1410, a memory 1420, an input/output interface 1430, a communications interface 1440, and a bus 1450. The processor 1410, the memory 1420, the input/output interface 1430, and the communications interface 1440 are communicatively connected to each other inside the device by using the bus 1450.

The processor 1410 can be implemented by using a general Central Processing Unit (CPU), a microprocessor, an Application Specific Integrated Circuit (ASIC), one or more integrated circuits, etc., and is configured to execute a related program, so as to implement the technical solutions provided in some embodiments of the present specification.

The memory 1420 can be implemented by using a Read Only Memory (ROM), a Random Access Memory (RAM), a static storage device, a dynamic storage device, etc. The memory 1420 can store an operating system and another application program. When the technical solutions provided in some embodiments of the present specification are implemented by using software or firmware, related program code is stored in the memory 1420, and is invoked and executed by the processor 1410.

The input/output interface 1430 is configured to be connected to an input/output module, to input or output information. The input/output module (not shown in the figure) can be used as a component and configured in the device, or can be externally connected to the device, to provide a corresponding function. The input module can include a keyboard, a mouse device, a touchscreen, a microphone, various sensors, etc. The output module can include a monitor, a speaker, a vibrator, an indicator, etc.

The communications interface 1440 is configured to be connected to a communications module (not shown in the figure), to implement a communication interaction between the device and another device. The communications module can perform communication in a wired way (for example, USB or a network cable), or can perform communication in a wireless way (for example, a mobile network, Wi-Fi, or Bluetooth).

The bus 1450 includes one channel, used to transmit information between components (for example, the processor 1410, the memory 1420, the input/output interface 1430, and the communications interface 1440) of the device.

It is worthwhile to note that although only the processor 1410, the memory 1420, the input/output interface 1430, the communications interface 1440, and the bus 1450 of the device are shown, during specific implementation, the device can further include other components needed for implementing normal running. In addition, a person skilled in the art can understand that the device can include only components necessary for implementing the solutions in some embodiments of the present specification, but does not necessarily include all components shown in the figure.

Some embodiments of the present specification further provides a computer readable storage medium. The computer readable storage medium stores a computer program. When executing the program, a processor implements the functions of the method in FIG. 2.

The computer readable medium includes permanent, non-permanent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It can be understood from the previous descriptions of the implementations that, a person skilled in the art can clearly understand that some embodiments of the present specification can be implemented by using software and a necessary general hardware platform. Based on such an understanding, the technical solutions in some embodiments of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in some embodiments of the present specification or in some parts of some embodiments of the present specification.

The system, method, module, or unit illustrated in the previous embodiments can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Some embodiments in the present specification are described in a progressive way. For same or similar parts of some embodiments, references can be made to some embodiments. Each embodiment focuses on a difference from other embodiments. Particularly, device embodiments are similar to method embodiments, and therefore is described briefly. For a related part, references can be made to some descriptions in the method embodiments. The previously described apparatus embodiments are merely examples. The modules described as separate parts can or cannot be physically separate. During implementation of the solutions in some embodiments of the present application, functions of the modules can be implemented in one or more pieces of software and/or hardware. Some or all of the modules can be selected based on an actual need to implement the solutions of some embodiments. A person of ordinary skill in the art can understand and implement some embodiments of the present application without creative efforts.

The previous descriptions are merely specific implementations of some embodiments of the present application. It is worthwhile to note that a person of ordinary skill in the art can further make several improvements or polishing without departing from the principle of some embodiments of the present application, and the improvements or polishing shall fall within the protection scope of some embodiments of the present application.

What is claimed is:

1. A computer-implemented method for recording data, comprising:
   in response to receiving data to be recorded, generating, by a node in a first-type blockchain network, a first-type blockchain transaction comprising the data;
   transmitting, by the node in the first-type blockchain network, the first-type blockchain transaction to the first-type blockchain network;
   recording, by the node based on a consensus algorithm, one or more first-type blockchain transactions into a first-type block;
   recording, by the node, the first-type block on a blockchain of the first-type blockchain network;
   determining, by the node, a transaction hash of each of the one or more first-type blockchain transactions in the first-type block;
   receiving, by a target node in a second-type blockchain network and as a received transaction hash, the transaction hash of each of the one or more first-type blockchain transactions;
   generating, by the target node and for each transaction hash, a corresponding second-type blockchain transaction based on the received transaction hash;
   storing, by the target node and for the one or more first-type blockchain transactions, a network identifier of the first-type blockchain network with the received transaction hash as the corresponding second-type blockchain transaction;
   transmitting, by the target node, each second-type blockchain transaction to the second-type blockchain network;
   recording, by the target node based on the consensus algorithm, one or more second-type blockchain transactions into a second-type block;
   recording, by the target node, the second-type block on a blockchain of the second-type blockchain network;
   in response to receiving a verification request, verifying, by the target node in the second-type blockchain network, the data to be recorded is recorded in the first-type blockchain network;
   in response to receiving a query of the corresponding second-type blockchain transaction, sending, by the target node, the transaction hash to the first-type blockchain network based on the network identifier; and
   in response to sending the transaction hash to the first-type blockchain network, receiving, by the target node, the first-type blockchain transaction corresponding to the transaction hash of the first-type blockchain network.

2. The computer-implemented method according to claim 1, wherein receiving the transaction hash of each of the one or more first-type blockchain transactions comprises:
   receiving each of the one or more second-type blockchain transactions corresponding to each of the one or more first-type blockchain transactions based on an order of the one or more first-type blockchain transactions recorded in a first-type recording block; and
   transmitting, by the target node, each second-type blockchain transaction to the second-type blockchain network comprises:
   transmitting each of the one or more second-type blockchain transactions corresponding to the transaction hash of each of the one or more second-type blockchain transactions based on an order that the transaction hash is received.

3. The computer-implemented method according to claim 1, further comprising:
   in response to receiving data to be recorded, generating, by a node in a third-type blockchain network, a third-type blockchain transaction comprising the data;
   transmitting the third-type blockchain transaction to the third-type blockchain network;
   recording, by the node in the third-type blockchain network based on the consensus algorithm, one or more third-type blockchain transactions into a third-type block;
   recording, by the node in the third-type blockchain network, the third-type block on a blockchain of the third-type blockchain network;
   determining, by the node in the third-type blockchain network, a second transaction hash of each of the one or more third-type blockchain transactions;

generating, by the target node for each second transaction hash, a second-type blockchain transaction comprising the second transaction hash; and transmitting, by the target node, the second-type blockchain transaction corresponding to each second transaction hash of each of the one or more third-type blockchain transactions to the second-type blockchain network.

4. The computer-implemented method according to claim 3, wherein transmitting, by the target node, the second-type blockchain transaction corresponding to each second transaction hash of each of the one or more third-type blockchain transactions comprises:

transmitting the second-type blockchain transaction corresponding to each second transaction hash of each of the one or more third-type blockchain transactions based on an order of the one or more third-type blockchain transactions recorded in the third-type block.

5. The computer-implemented method according to claim 3, wherein generating the second-type blockchain transaction comprising the second transaction hash comprises:

generating the second-type blockchain transaction comprising the second transaction hash of the third-type blockchain transaction and a network identifier of the third-type blockchain network.

6. The computer-implemented method according to claim 3, wherein the method further comprises:

generating, for each second transaction hash, the second-type blockchain transaction comprising the second transaction hash and a network identifier of the third-type blockchain network.

7. A non-transitory, computer-readable medium storing one or more instructions executable by a computer system to perform operations comprising:

in response to receiving data to be recorded, generating, by a node in a first-type blockchain network, a first-type blockchain transaction comprising the data;

transmitting, by the node in the first-type blockchain network, the first-type blockchain transaction to the first-type blockchain network;

recording, by the node based on a consensus algorithm, one or more first-type blockchain transactions into a first-type block;

recording, by the node, the first-type block on a blockchain of the first-type blockchain network;

determining, by the node, a transaction hash of each of the one or more first-type blockchain transactions in the first-type block;

receiving, by a target node in a second-type blockchain network and as a received transaction hash, the transaction hash of each of the one or more first-type blockchain transactions;

generating, by the target node and for each transaction hash, a corresponding second-type blockchain transaction based on the received transaction hash;

storing, by the target node and for the one or more first-type blockchain transactions, a network identifier of the first-type blockchain network with the received transaction hash as the corresponding second-type blockchain transaction;

transmitting, by the target node, each second-type blockchain transaction to the second-type blockchain network;

recording, by the target node based on the consensus algorithm, one or more second-type blockchain transactions into a second-type block;

recording, by the target node, the second-type block on a blockchain of the second-type blockchain network;

in response to receiving a verification request, verifying, by the target node in the second-type blockchain network, the data to be recorded is recorded in the first-type blockchain network;

in response to receiving a query of the corresponding second-type blockchain transaction, sending, by the target node, the transaction hash to the first-type blockchain network based on the network identifier; and in response to sending the transaction hash to the first-type blockchain network, receiving, by the target node, the first-type blockchain transaction corresponding to the transaction hash of the first-type blockchain network.

8. The non-transitory, computer-readable medium according to claim 7, wherein receiving the transaction hash of each of the one or more first-type blockchain transactions comprises:

receiving each of the one or more second-type blockchain transactions corresponding to each of the one or more first-type blockchain transactions based on an order of the one or more first-type blockchain transactions recorded in a first-type recording block; and transmitting, by the target node, each second-type blockchain transaction to the second-type blockchain network comprises:

transmitting each of the one or more second-type blockchain transactions corresponding to the transaction hash of each of the one or more second-type blockchain transactions based on an order that the transaction hash is received.

9. The non-transitory, computer-readable medium according to claim 7, the operations further comprising:

in response to receiving data to be recorded, generating, by a node in a third-type blockchain network, a third-type blockchain transaction comprising the data;

transmitting the third-type blockchain transaction to the third-type blockchain network;

recording, by the node in the third-type blockchain network based on the consensus algorithm, one or more third-type blockchain transactions into a third-type block;

recording, by the node in the third-type blockchain network, the third-type block on a blockchain of the third-type blockchain network;

determining, by the node in the third-type blockchain network, a second transaction hash of each of the one or more third-type blockchain transactions;

generating, by the target node for each second transaction hash, a second-type blockchain transaction comprising the second transaction hash; and transmitting, by the target node, the second-type blockchain transaction corresponding to each second transaction hash of each of the one or more third-type blockchain transactions to the second-type blockchain network.

10. The non-transitory, computer-readable medium according to claim 9, wherein transmitting, by the target node, the second-type blockchain transaction corresponding to each second transaction hash of each of the one or more third-type blockchain transactions comprises:

transmitting the second-type blockchain transaction corresponding to each second transaction hash of each of the one or more third-type blockchain transactions based on an order of the one or more third-type blockchain transactions recorded in the third-type block.

11. The non-transitory, computer-readable medium according to claim 9, wherein generating the second-type blockchain transaction comprising the second transaction hash comprises:
generating the second-type blockchain transaction comprising the second transaction hash of the third-type blockchain transaction and a network identifier of the third-type blockchain network.

12. The non-transitory, computer-readable medium according to claim 9, wherein the operations further comprising:
generating, for each second transaction hash, the second-type blockchain transaction comprising the second transaction hash and a network identifier of the third-type blockchain network.

13. A computer-implemented system, comprising: one or more computers; and
one or more computer memory devices interoperably coupled with the one or more computers and having tangible, non-transitory, machine-readable media storing one or more instructions that, when executed by the one or more computers, perform one or more operations comprising:
in response to receiving data to be recorded, generating, by a node in a first-type blockchain network, a first-type blockchain transaction comprising the data;
transmitting, by the node in the first-type blockchain network, the first-type blockchain transaction to the first-type blockchain network;
recording, by the node based on a consensus algorithm, one or more first-type blockchain transactions into a first-type block;
recording, by the node, the first-type block on a blockchain of the first-type blockchain network;
determining, by the node, a transaction hash of each of the one or more first-type blockchain transactions in the first-type block;
receiving, by a target node in a second-type blockchain network and as a received transaction hash, the transaction hash of each of the one or more first-type blockchain transactions;
generating, by the target node and for each transaction hash, a corresponding second-type blockchain transaction based on the received transaction hash;
storing, by the target node and for the one or more first-type blockchain transactions, a network identifier of the first-type blockchain network with the received transaction hash as the corresponding second-type blockchain transaction;
transmitting, by the target node, each second-type blockchain transaction to the second-type blockchain network;
recording, by the target node based on the consensus algorithm, one or more second-type blockchain transactions into a second-type block;
recording, by the target node, the second-type block on a blockchain of the second-type blockchain network;
in response to receiving a verification request, verifying, by the target node in the second-type blockchain network, the data to be recorded is recorded in the first-type blockchain network;
in response to receiving a query of the corresponding second-type blockchain transaction, sending, by the target node, the transaction hash to the first-type blockchain network based on the network identifier; and
in response to sending the transaction hash to the first-type blockchain network, receiving, by the target node, the first-type blockchain transaction corresponding to the transaction hash of the first-type blockchain network.

14. The computer-implemented system according to claim 13, wherein receiving the transaction hash of each of the one or more first-type blockchain transactions to the target node comprises:
receiving each of the one or more second-type blockchain transactions corresponding to each of the one or more first-type blockchain transactions based on an order of the one or more first-type blockchain transactions recorded in a first-type recording block; and
transmitting, by the target node, each second-type blockchain transaction to the second-type blockchain network comprises:
transmitting each of the one or more second-type blockchain transactions corresponding to the transaction hash of each of the one or more second-type blockchain transactions based on an order that the transaction hash is received.

15. The computer-implemented system according to claim 13, the one or more operations further comprising:
in response to receiving data to be recorded, generating, by a node in a third-type blockchain network, a third-type blockchain transaction comprising the data;
transmitting the third-type blockchain transaction to the third-type blockchain network;
recording, by the node in the third-type blockchain network based on the consensus algorithm, one or more third-type blockchain transactions into a third-type block;
recording, by the node in the third-type blockchain network, the third-type block on a blockchain of the third-type blockchain network;
determining, by the node in the third-type blockchain network, a second transaction hash of each of the one or more third-type blockchain transactions;
generating, by the target node for each second transaction hash, a second-type blockchain transaction comprising the second transaction hash; and
transmitting, by the target node, the second-type blockchain transaction corresponding to each second transaction hash of each of the one or more third-type blockchain transactions to the second-type blockchain network.

16. The computer-implemented system according to claim 15, wherein transmitting, by the target node, the second-type blockchain transaction corresponding to each second transaction hash of each of the one or more third-type blockchain transactions comprises:
transmitting the second-type blockchain transaction corresponding to each second transaction hash of each of the one or more third-type blockchain transactions based on an order of the one or more third-type blockchain transactions recorded in the third-type block.

17. The computer-implemented system according to claim 15, wherein generating the second-type blockchain transaction comprising the second transaction hash comprises:
generating the second-type blockchain transaction comprising the second transaction hash of the third-type blockchain transaction and a network identifier of the third-type blockchain network.

18. The computer-implemented system according to claim 15, wherein the operations further comprising:
generating, for each second transaction hash, the second-type blockchain transaction comprising the second transaction hash and a network identifier of the third-type blockchain network.

* * * * *